No. 868,085. PATENTED OCT. 15, 1907.
H. C. GOODRICH.
HOT WATER HEATER.
APPLICATION FILED JUNE 10, 1907.
2 SHEETS—SHEET 1.
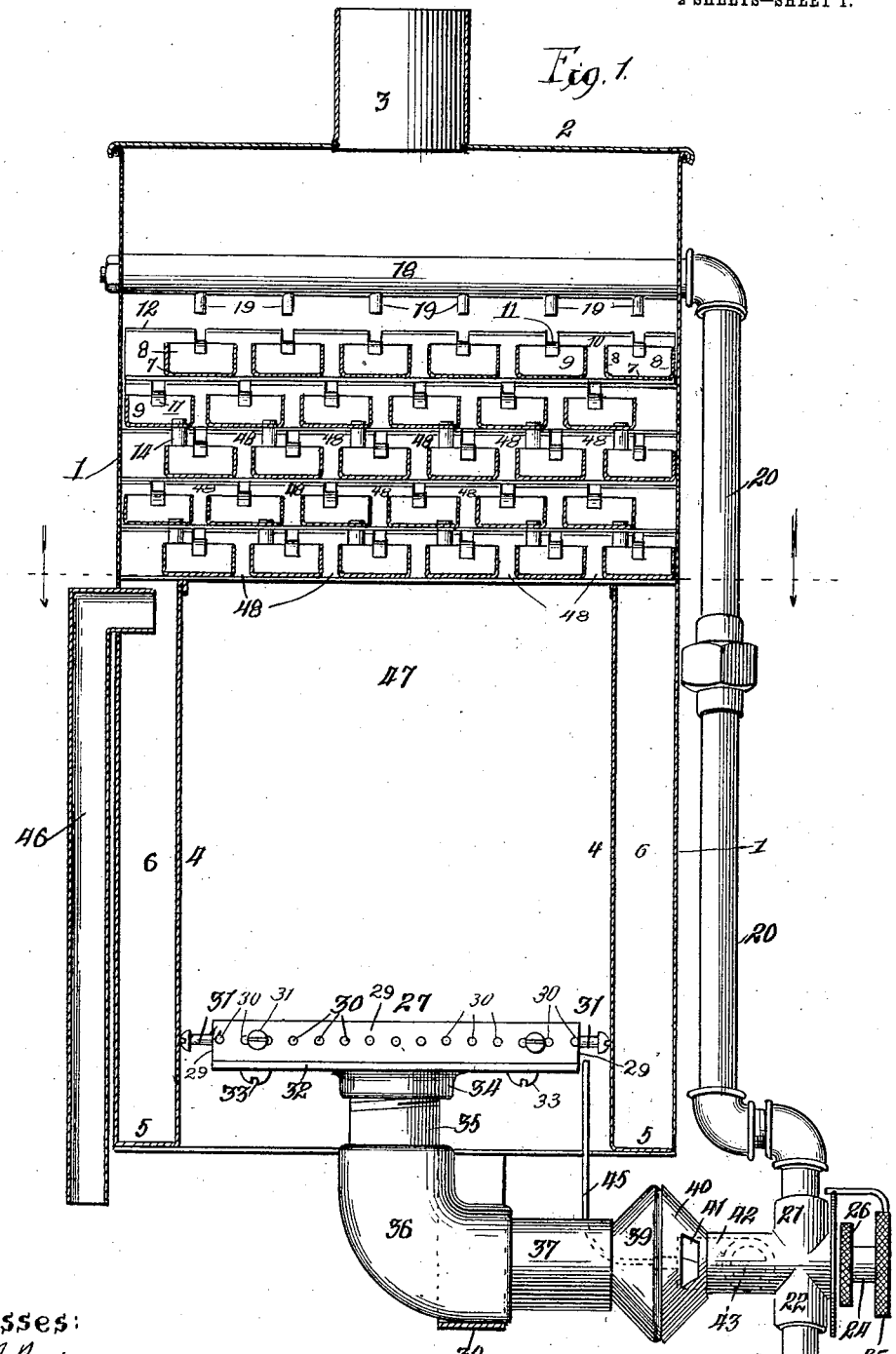

No. 868,085. PATENTED OCT. 15, 1907.
H. C. GOODRICH.
HOT WATER HEATER.
APPLICATION FILED JUNE 10, 1907.
2 SHEETS—SHEET 2.
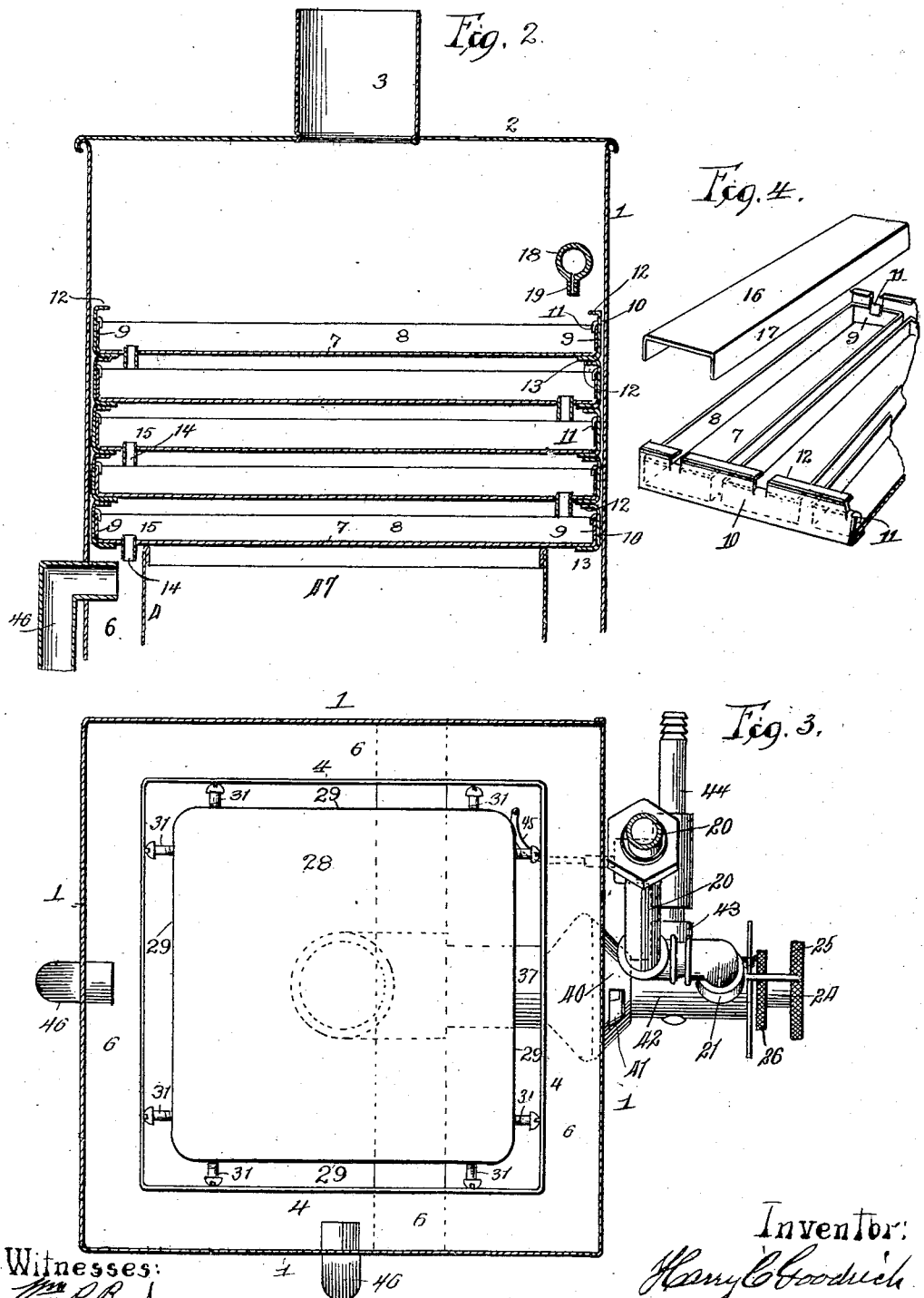
Witnesses:
Wm P. Bond
Oscar W. Bond
Inventor:
Harry C. Goodrich

UNITED STATES PATENT OFFICE.

HARRY C. GOODRICH, OF OAK PARK, ILLINOIS.

HOT-WATER HEATER.

No. 868,085.  Specification of Letters Patent.  Patented Oct. 15, 1907.

Application filed June 10, 1907. Serial No. 378,095.

*To all whom it may concern:*

Be it known that I, HARRY C. GOODRICH, a citizen of the United States, residing at Oak Park, in the county of Cook and State of Illinois, have invented certain new and useful Improvements in Hot-Water Heaters, of which the following is a specification.

This invention relates more particularly to what may be termed portable hot water heaters, by which is meant small sized heaters for household and other uses where a continued supply of hot water is not required or needed, and where the hot water when required or needed can be readily obtained by the use of the heater.

The objects of the invention are to construct a simple, efficient and reliable hot water heater, which can be readily connected with a water supply and gas supply for heating the water; to construct a hot water heater at a small cost and which can be operated with but little expense; to construct a water heater with an outer shell or casing of thin metal or other suitable material, and an inner shell or casing of thin metal or material, both shells or casings of a square or rectangular formation in cross-section; to furnish a hot water heater having an outer shell or casing and an inner shell or casing of a less height than the outer shell or casing and locating in the outer shell or casing above the inner shell or casing a tier of troughs or conduits for the passage of the water to be heated; to furnish a receiving chamber for the hot water located between the walls of the outer and inner shells or casings, and below the tier of water troughs or conduits; to locate a burner at the bottom of the inner shell or casing, with the burner so formed and arranged as to project the flame jets against the inner faces of the walls of the inner shell or casing; to furnish a heat chamber above the burner within the inner shell or casing and to space apart the separate troughs or conduits of each row and form heat passages; to so arrange the heat chamber above the burner and the heat passages between the separate troughs or conduits as to compel the heat units to pass upwardly and thereby utilize the entire amount of heat units approximately in heating the descending water; to arrange the discharge for each trough or conduit of the rows of troughs or conduits so as to give a travel for the water from alternate ends of adjoining troughs or conduits, making a sinuous flow for the water from the upper row of troughs or conduits to the lower row of troughs or conduits; to furnish discharge pipes leading from the upper end of the receiving chamber for the hot water; and to improve generally the construction, arrangement and operation of the various parts and elements entering into the formation of the hot water heater of the invention, as a whole.

The invention consists in the features of construction and combination of parts hereinafter described and claimed.

In the drawings, Figure 1 is a central sectional eleva-
tion of the heater showing the water supply pipe, the controlling valve for the water and gas and the burner in elevation; Fig. 2, a central sectional elevation crosswise to Fig. 1, of the upper portion of the heater; Fig.
3, a sectional plan view showing the heat chamber, the burner and the controlling valve for the water and gas; and Fig. 4, a detail in perspective showing a trough or conduit and a cover therefor, the cover being removed.

The heater of the present invention has an outer shell or casing formed of four side walls 1, a cap or cover 2, with a draft flue or chimney 3 at the center of cap or cover, and an open bottom. The side walls 1 and cap or cover 2 can be made of sheet copper or other suitable heat transmitting metal or material, and the heater is preferably of a square or rectangular form in cross-section, and the cross dimension and height can be varied to suit the desired size and capacity for the heater.

The heater has an inner shell or casing with four side walls 4, of sheet copper or other suitable heat transmitting metal or material, and open at the top and bottom; and the inner shell or casing has, on the bottom of each side wall 4, a flanges by means of which the inner shell or casing is attached to the outer shell or casing at the bottom so as to centrally locate the inner shell or casing and furnish a chamber 6 between the side walls of the two shells or casings into which chamber the heated water descends to be still further heated for withdrawal from the chamber.

The interior of the outer shell or casing has located therein above the top of the inner shell or casing several tiers of heating troughs or conduits arranged in series, each series comprising several independent and distinct troughs or conduits. The troughs or conduits can be made of sheet copper or other suitable metal or material possessing the quality or character of being a good conductor and transmitter of heat. Each trough or conduit has a bottom wall 7, side walls 8 and end walls 9, and the end walls 9 for the troughs or conduits of a series are all connected to end strips 10 by clips or ears 11 formed in the end strips and turned over and down on the ends of the troughs, uniting the troughs or conduits of a row to the end strips; and when connected or united to the end strips adjoining troughs or conduits will have a space between them, for the spaces, when the rows of troughs or conduits are arranged in tiers one on the other, to stand in staggered relation, as shown in Fig. 1, with the spaces between the troughs or conduits of a lower row in line centrally with the bottom of the next higher row. Each end securing strip 10 has at its top or upper edge an inwardly turned flange 12, and at its bottom or lower edge an inwardly turned flange 13, which flanges form rests or supports for one row of troughs or conduits on the other; and, as shown, the lower row of troughs or conduits rests on, or is supported by, the top of the inner shell or casing of the heater, but could be otherwise supported.

Each trough or conduit at one end has a discharge tube 14, and these discharge tubes are arranged at opposite ends of adjoining troughs or conduits, so that water supplied to the closed end of a trough or conduit must flow the entire length of a trough or conduit before discharging, and in this way the water will be given a sinuous flow from the top to the bottom of the tier of troughs or conduits. Each tube 14 projects slightly above the upper plane or face of the bottom of the trough or conduit, and this projected upper end of each tube forms an abutment or dam 15 preventing any discharge of the water from the trough or conduit until the water has reached a height or depth to overflow the top of the abutment or dam. This arrangement keeps a shallow depth of water in each trough or conduit, after the flow of water is once started through and down the heating troughs or conduits, so that the heat will act rapidly and effectively on the water in each trough or conduit, as the water flows from the closed end to the discharge end of the trough or conduit. Each trough or conduit can be left open on the top or upper side, or can be closed by a suitable cover, shown raised or detached in Fig. 4, and formed with a top plate 16 and side plates or flanges 17, to pass outside of the side plates or walls 8 of the trough, the cover at one end having a hole for the passage of the discharge tube 14 of the adjoining trough or conduit, so as to allow the water to flow downwards from trough or conduit to trough or conduit.

A water supply pipe or header 18 is located at the top of the heater and extends cross-wise of the upper row of troughs or conduits at one end of the row; and this pipe or header 18 has, on its under side, a plurality of nipples or tubes 19, one nipple or tube for each upper trough or conduit, each nipple or tube 19 discharging water from the pipe or header 18 into the trough or conduit at its closed end for the water to flow to the discharge end of the trough or conduit. One end of the pipe or header 18 is closed and to its other end is connected the upper end of a lead pipe 20, the other end of which is entered into a neck or boss 21 on one side of the casing of a controlling valve, and the opposite side of the casing has a neck or boss 22 into which is entered a pipe 23 leading from a source of water supply, so that by opening the valve water will flow into the pipe or header 18 to discharge into the upper row of troughs or conduits. The valve has a stem 24 operated by a hand wheel 25, and a gland 26 closes end of the valve casing around the stem, as usual.

At the bottom of and within the inner shell or casing is located a burner 27 of a square or rectangular formation in cross-section. This burner has a closed top wall 28 and four side walls 29, and each side wall has therein a row of perforations 30, for the escape and ignition of the gas. Each side wall 29 has adjusting screws or pins 31, by means of which the burner can be properly centered within the inner shell or casing, so as to leave a space on all four sides of the burner to admit air to feed and maintain the flame of the burner.

The bottom of the burner is closed by a plate 32 attached to the walls of the burner by screws 33, and at the center of the plate 32 is an annular rim or boss 34, into which is entered one end of a pipe 35, the other end of which is entered into one end of an elbow coupling 36, having connected to its other end one end of a pipe 37, which as shown is supported by a strap 38 depending from the inner shell or casing so as to hold the burner in place within the inner shell or casing.

The outer end of the pipe 37 has attached thereto the fixed section 39 of an air or gas mixer or carbureter, the movable or adjustable section 40 of which is connected by a neck or boss 42 with the casing of the controlling valve and has openings 41 for admitting the required amount of air to chamber of the mixer or carbureter to combine with the gas for combustion at the burner, which mixer or carbureter can be of any usual and well known construction. A neck or boss 43 on the casing of the controlling valve has attached thereto one end of a nipple or tube 44, the other end of which has a screw thread for the attachment of a hose or pipe (not shown) leading from a source of gas supply. The controlling valve of the stem 24 can be made to control both the water and gas supply, or a separate valve can be used to control the two supplies. A pilot or lighter 45 can be connected with the gas, so as to maintain a flame or supply a flame for lighting the gas at the burner.

The arrangement shown has a discharge pipe 46 on two walls or sides of the outer shell or casing, both pipes opening into the space or chamber 6 adjacent to its top. These pipes can have suitable valves to control the discharge, if so desired, and these pipes 46 each serve to discharge the hot water from the space or chamber 6, for such disposition as may be desired.

The operation will be understood from the foregoing description; but, briefly, is as follows: The heater is located at the place of use and the controlling valve is connected with the water and gas supply, setting up the heater ready for use; and in use the controlling valve is turned to admit water to pipe or header 18 and gas to the burner 27, for the water to flow from the pipe or header 18 and the gas to be ignited and furnish the heat for acting on the water. The water as it is discharged from the pipe or header 18 enters the upper row of troughs or conduits and flows down in a sinuous manner from one row of troughs or conduits, to the next succeeding row of troughs or conduits, and is finally discharged into the space or chamber 6 between the inner and outer shells or casings. The jets of flame from the burner project in a straight line so as to impinge or strike against the inner face of the walls of the inner shell or casing, transmitting their full heat to such walls at the point of contact; and the heat of the flames is carried upwardly, by the inflowing air entering around the burner through the heat chamber 47 inclosed by the inner shell or casing, and strikes against the bottoms of the lower row of troughs or conduits, and is deflected and passes through the openings or passages 48 between the separate troughs or conduits of the row, to strike against the bottoms of the next higher row of troughs or conduits and be deflected to pass through the openings or passages of that row of troughs or conduits and so on for all of the rows of troughs or conduits from the bottom to the top, escaping above the top row of troughs or conduits to discharge at the flue or chimney on the top plate of the heater. The upward passage of the heat striking the bottoms and sides of the troughs or conduits of the several rows of troughs or conduits imparts heat to the bottom and sides of all the troughs or conduits, and this heat is transmitted to and heats the water in each trough or conduit, as the water descends, and the water when it discharges into the space or chamber 6 will be hot and will be made hotter by the heat from the walls of the inner shell or casing.

It is to be noted that when the gas is ignited the flame therefrom impinges directly against the thin wall of the inner shell or casing of the water jacket, thereby expending all its heat effectiveness thereon and heating the deposited water almost instantly; and at the same time the remaining units of heat will rise within the chamber above the burner and strike against the bottom and side walls of all the troughs or conduits forming the waterway as the heat rises through the tier of rows of waterways, for the heat to act and heat the water in each trough or conduit.

The depth of water should be about one-eighth of an inch or less at all times, and that depth of water is retained by reason of the abutment or dam at the exit port or discharge tube of each water way, the lower portion of which tube prevents creeping. The water entering the first or top row of troughs, conduits or waterways fills the same to the extent allowed by the abutment or dam, and then overflows to the next row below, flowing back in the opposite direction, filling that row in the same manner and so on until the last row of troughs, conduits or waterways is reached from which the water overflows into the receiving chamber or water jacket in which the now hot water must rise and overflow through the discharge pipe or pipes into any receptacle desired. The discharge pipe should not enter the outer shell or casing at the highest point of the receiving chamber or water jacket, but at such point as that one or more overflow pipes can be inserted if so required, as when the first pipe does not carry away the flow of water that first enters the one discharge pipe.

The water supply pipe on the outside of the body of the heater supplies cold water to the cross-pipe or header for discharging water into the troughs, conduits or waterways through the nipples, so that the water will be carried and discharged in each upper trough, conduit or waterway. The controlling valve can be one to regulate and control both the flow of water and gas, by a quarter revolution of the valve, thus enabling the same valve to control water and gas in the quantities required to give any desired degree of heat to the water as it flows through the heater. The gas flow can be partly shut off in case it is not desired to heat as high as when the gas is fully turned on to the burner.

The heater of the present invention will heat the water rapidly and will be found economical in the use of gas, as the heat units are compelled to act from the burner upward in heating the water with the result that practically an efficiency of nearly 100 will be obtained, which is double or nearly so of ordinary hot water heaters, and at the chimney or discharge flue a heat of 68° Fahrenheit will be all that is shown, which discloses that the entire effective heat units have been utilized in heating the water.

What I claim as new and desire to secure by Letters Patent is:

1. In a hot water heater, an outer shell and an inner shell both of a rectangular form in cross section with a hot water receiving chamber between the two shells, and both shells made of thin heat transmitting material, a tier of rows of water troughs above the inner shell and within the outer shell, each row consisting of a plurality of troughs with a separating space between the single troughs, and means for supplying water to descend through the row of troughs and discharge into the hot water receiving chamber, substantially as described.

2. In a hot water heater, an outer shell and an inner shell both of a rectangular form in cross section with a hot water receiving chamber between the two shells, and both shells made of thin heat transmitting material, a tier of rows of water troughs above the inner shell and within the outer shell, each row consisting of a plurality of troughs with a separating space between the single troughs, means for supplying water to descend through the row of troughs and discharge into the hot water receiving chamber, a rectangular burner within the bottom of the inner casing and having perforated side walls, and means for supplying gas to the burner, substantially as described.

3. In a hot water heater, an outer shell and an inner shell both of a rectangular form in cross section with a hot water receiving chamber between the two shells, and both shells made of thin heat transmitting material, a tier of rows of water troughs above the inner shell and within the outer shell, each row consisting of a plurality of troughs with a separating space between the single troughs, means for supplying water to descend through the row of troughs and discharge into the hot water receiving chamber, a rectangular burner within the bottom of the inner casing and having perforated side walls, means for supplying gas to the burner, and a discharge pipe for hot water leading from the upper end of the hot water chamber, substantially as described.

4. In a hot water heater, an outer shell and an inner shell both of a rectangular form in cross section with a hot water receiving chamber between the two shells and both shells made of thin heat transmitting material, a tier of rows of water troughs above the inner shell and within the outer shell, each row consisting of a plurality of troughs spaced apart, a connecting strip for each end of each row of troughs, a discharge tube at one end of each trough, with the discharge tube of adjacent rows of troughs located at opposite ends of the troughs giving a sinuous travel to the water in descending, and a rectangular burner at the bottom of and within the inner shell, substantially as described.

5. In a hot water heater, an outer shell and an inner shell both of a rectangular form in cross section with a hot water receiving chamber between the two shells and both shells made of thin heat transmitting material, a tier of rows of water troughs above the inner shell and within the outer shell, each row consisting of a plurality of troughs spaced apart, a connecting strip for each end of each row of troughs, a discharge tube at one end of each trough, with the discharge tube of adjacent rows of troughs located at opposite ends of the troughs giving a sinuous travel to the water in descending, each tube having a dam around its upper end within the trough, and a rectangular burner at the bottom of and within the inner shell, substantially as described.

6. In a water heater, the combination of an outer shell, an inner shell of less height than the outer shell and forming with the outer shell a hot water chamber closed at the bottom and open at the top, a tier of rows of water carrying troughs above the inner shell and within the outer shell, each row consisting of a plurality of troughs spaced apart and each trough at one end having a discharge surrounded by a dam within the trough, and a burner at the bottom of and within the inner shell, substantially as described.

7. In a water heater, the combination of an outer shell, an inner shell of less height than the outer shell and forming with the outer shell a hot water chamber closed at the bottom and open at the top, a tier of rows of water carrying troughs above the inner shell and within the outer shell, each row consisting of a plurality of troughs spaced apart and each trough at one end having a discharge surrounded by a dam within the trough, a burner at the bottom of and within the inner shell, means for supplying water to the troughs, and means for supplying gas to the burner, substantially as described.

8. In a water heater, the combination of an outer shell, an inner shell of less height than the outer shell and forming with the outer shell a hot water chamber closed at the bottom and open at the top, a tier of rows of water carrying troughs above the inner shell and within the outer shell, each row consisting of a plurality of troughs spaced apart and each trough at one end having a discharge surrounded by a dam within the trough, a burner at the bottom of and within the inner shell, means for supplying water to the troughs, means for supplying gas to the burner, and means for discharging hot water from the receiving chamber, substantially as described.

9. In a water heater, the combination of an outer shell, an inner shell of less height than the outer shell and forming with the outer shell a hot water chamber closed at the bottom and open at the top, a tier of rows of water carrying troughs above the inner shell and within the outer shell, each row consisting of a plurality of troughs spaced apart and each trough at one end having a discharge surrounded by a dam within the trough, a burner at the bottom of and within the inner shell, means for supplying water to the troughs, means for supplying gas to the burner, means for discharging hot water from the receiving chamber, and a controlling valve for the water and gas supplies, substantially as described.

HARRY C. GOODRICH.

Witnesses:
 OSCAR W. BOND,
 FRANCES M. FROST.